United States Patent [19]

Zijderhand

[11] Patent Number: 5,629,942

[45] Date of Patent: May 13, 1997

[54] METHOD AND ARRANGEMENT FOR CHANNEL ALLOCATION FOR DATA TRANSMISSION BETWEEN A MAIN STATION AND A PLURALITY OF SUBSTATIONS

[75] Inventor: Frans Zijderhand, Eindhoven, Netherlands

[73] Assignee: U.S. Philips Corporation, New York, N.Y.

[21] Appl. No.: 427,647

[22] Filed: Apr. 24, 1995

Related U.S. Application Data

[63] Continuation of Ser. No. 909,893, Jul. 7, 1992, abandoned.

[30] Foreign Application Priority Data

Jul. 8, 1991 [EP] European Pat. Off. ............... 91201765

[51] Int. Cl.⁶ ........................................... H04J 3/16
[52] U.S. Cl. ........................... 370/341; 370/349; 370/461; 340/825.08
[58] Field of Search ........................... 370/80, 85.2, 85.3, 370/85.7, 85.8, 94.1, 95.1, 95.2, 95.3, 104.1; 340/825.08, 825.54

[56] References Cited

U.S. PATENT DOCUMENTS

| | | | |
|---|---|---|---|
| 4,466,001 | 8/1984 | Moore et al. ...................... | 340/825.08 |
| 4,538,261 | 8/1985 | Kume ................................. | 370/85.2 |
| 4,612,637 | 9/1986 | Davis et al. ...................... | 370/95.3 |
| 4,736,371 | 4/1988 | Tejima et al. ...................... | 370/95.1 |
| 4,742,512 | 5/1988 | Akashi et al. ..................... | 370/104.1 |
| 4,774,707 | 9/1988 | Raychaudhuri .................... | 370/85.2 |
| 4,807,223 | 2/1989 | Wells .................................. | 370/85.2 |
| 4,809,268 | 2/1989 | Tejima et al. ...................... | 370/95.2 |
| 4,866,709 | 9/1989 | West et al. ......................... | 370/82 |
| 4,907,224 | 3/1990 | Scoles et al. ...................... | 370/85.2 |
| 5,012,469 | 4/1991 | Sardana ............................. | 370/95.3 |
| 5,231,634 | 7/1993 | Giles et al. ........................ | 370/95.1 |

OTHER PUBLICATIONS

MLG Thoone, "CARIN, a Car Information and Navigation System," Philips Technical Review, vol. 43, # 11/12 Dec. 1987.

"Computer Networks", A.S. Tanenbaum, Prentice/Hall International Editions, Chapter 6, pp. 249–277.

"Mobile Information Systems", J. Walker—Editor, pp. 86–95.

*Primary Examiner*—Alpus H. Hsu
*Attorney, Agent, or Firm*—Arthur G. Schaier

[57] ABSTRACT

In a method of data transmission from a plurality of sub-stations to a main station over a common channel which is subdivided into time slots whose length and synchronization are determined by a corresponding time slot distribution of a data transmission signal sent out by the main station, in which each sub-station has a predetermined probability p of transmitting a data packet in each time slot, the throughput of the communication channel is improved in that if the main station has correctly received in a specific time slot (n) a data packet coming from a specific sub-station, always a next time slot (n+j) will be reserved to be exclusively used by that specific sub-station.

24 Claims, 4 Drawing Sheets

METHOD AND ARRANGEMENT FOR CHANNEL ALLOCATION FOR DATA TRANSMISSION BETWEEN A MAIN STATION AND A PLURALITY OF SUBSTATIONS

This is a continuation of application Ser. No. 07/909,893, filed on Jul. 7, 1992, now abandoned.

FIELD OF THE INVENTION

The invention relates to a method of transmitting data from a plurality of sub-stations to a main station by way of a common channel which is subdivided into time slots the length and synchronization of which being determined by a corresponding time slot distribution of a data transmission signal transmitted by the main station, each sub-station having in each time slot a predetermined probability p to transmit a data packet.

DESCRIPTION OF RELATED ART

A method of this type is known by the name of slotted ALOHA and is described, for example, in the book entitled "Computer Networks" by Andrew S. Tanenbaum, Prentice/Hall International Editions, Chapter 6, p. 253 ff. With this known method a sub-station sends a data packet which has a time length essentially corresponding to the time length of a time slot in a basically random time slot to the main station. Such a communication link to the main station will henceforth be called an uplink. There is also a communication link from the main station to the sub-stations, which will henceforth be called a downlink. The carrier frequency used for the downlink differs from the carrier frequency used for the uplink and is continuously monitored by all the active sub-stations. According to the known method the signal received by the main station is amplified and retransmitted, while the retransmitted signal may be received by all the active sub-stations, but is basically intended for only one specific sub-station. The transmitting sub-station too receives the data packet retransmitted by the main station and compares the data packet with its previously transmitted data packet. On the basis of the result of this comparison the sub-station determines whether the previously transmitted data packet has correctly been received and retransmitted by the main station, in which case a new data packet is transmitted, or transmission is stopped if no new data packet is present, or if an error situation occurs in which case the previously transmitted data packet is retransmitted.

A next transmission of a data packet, whether this is again the already transmitted data packet or a new data packet, is effected in a random time slot relative to the previously used time slot, the distance in time between the previously used time slot and the new time slot depending on said probability p.

The most important cause of an error situation is the concurrent transmission by two or more sub-stations. The data packet transmitted by the main station is then a combination of the two data packets received concurrently by the main station, and thus corresponds neither to the one nor to the other data packet, so that both sub-stations are to transmit their data packets once again. It will be obvious that the probability of such a data packet "collision" increases as the sub-stations transmit data packets more intensively, which causes a reduction of the user efficiency (denoted by the English term of throughput and expressed in the number of data bits received correctly via a communication channel per second divided by the maximum number of data bits that can be transmitted per second via that communication channel) of the communication channel. On the other hand, it will be obvious that when the sub-stations transmit less intensively, the probability of "colliding" data packets will be lower, it is true, but a reduction of the throughput of the communication channel may then occur as a result of reduced channel employment. The communication channel therefore has an optimum throughput of about 37% (cf. for example, page 256 of above-mentioned publication).

The throughput in practice of the communication channel will generally be lower than this maximum. An important reason for this is that with the known method the probability p is to be relatively small in order to ensure that the system is not "clogged" by messages to be transmitted even in the statistically improbable but not impossible case of the load of the communication channel being temporarily much larger than the average load.

A further objection of the known method is that the main station is constantly to repeat via the downlink the data packet received via the uplink, so that the transmitting sub-station "knows" whether a data packet has been properly received by the main station. This implies a considerable load of the communication capacity in the downlink and implies in practice that the downlink is exclusively used for repeating the data packets received by the uplink. Therefore, the known method is intended for communication between two sub-stations for which the main station acts only as relay station.

SUMMARY OF THE INVENTION

It is an object of the invention to improve the known method in general.

The invention specifically has for its object to improve the known method in such a way that it is also suitable for use in a system in which the main station does not operate as a relay station but as a receive station. This is understood to mean that the sub-stations send data packets to the main station, while the information contained in these data packets is intended in the first instance for the main station itself. The main station detects and processes the received information internally. The main station will also send information meant for the sub-stations by way of the downlink, but the data packets transmitted by the main station for this purpose differ from the data packets received by the main station. In that case the data packets received by the main station are not retransmitted, so that the sub-stations cannot detect by way of comparison whether a data packet has been received correctly.

The invention more specifically has for its object to improve a known method in such a way that the communication channel throughput found in practice is increased.

For this purpose, the method according to the invention is characterized, in that if the main station has correctly received in a specific time slot a data packet coming from a specific sub-station, a next time slot will be reserved to be exclusively used by that specific sub-station.

This achieves that when a specific sub-station has been given access to the communication channel because the first data packet of a message to be transmitted has been correctly received by the main station, the sub-station concerned is given the opportunity to finish its message to be transmitted without the next data packets running a risk of "colliding" with a data packet coming from another sub-station. The next data packets of the message to be transmitted are thus with no smaller measure of certainty received correctly by the main station, in other words, the throughput of the communication channel has improved, while a throughput of more than said optimum value of 37% may be attained.

In an embodiment the main station transmits in the time slot following said specific time slot a data packet comprising at least one bit which is indicative of the received condition of a data packet in said specific time slot. Not only does the relevant sub-station now know whether the data packet transmitted in the previous time slot has been received correctly, without the need for this sub-station to perform a comparison between the two data packets, but all the other active sub-stations will know this too. If the data packet transmitted in the previous time slot has indeed been received correctly, the relevant sub-station will transmit a next data packet in a predetermined next time slot, whereas the remaining sub-stations that have not transmitted a data packet in the previous time slot, will refrain from transmitting a data packet in said predetermined next time slot in response to receiving the bit indicative of the proper receive condition, so that this time slot is exclusively used by said specific sub-station.

The invention likewise relates to a communication system and a traffic information system in which the method according to the invention as claimed in claims 7 and 8 is implemented. The invention further relates to a sub-station arranged for operating in such a communication system or traffic information system according to the invention.

BRIEF DESCRIPTION OF THE DRAWINGS

Further aspects and advantages of the invention will be clarified by the following description of a preferred embodiment of the method according to the invention, while reference is made to the drawing Figures, in which.

DETAILED DESCRIPTION OF THE INVENTION

Figure 1:
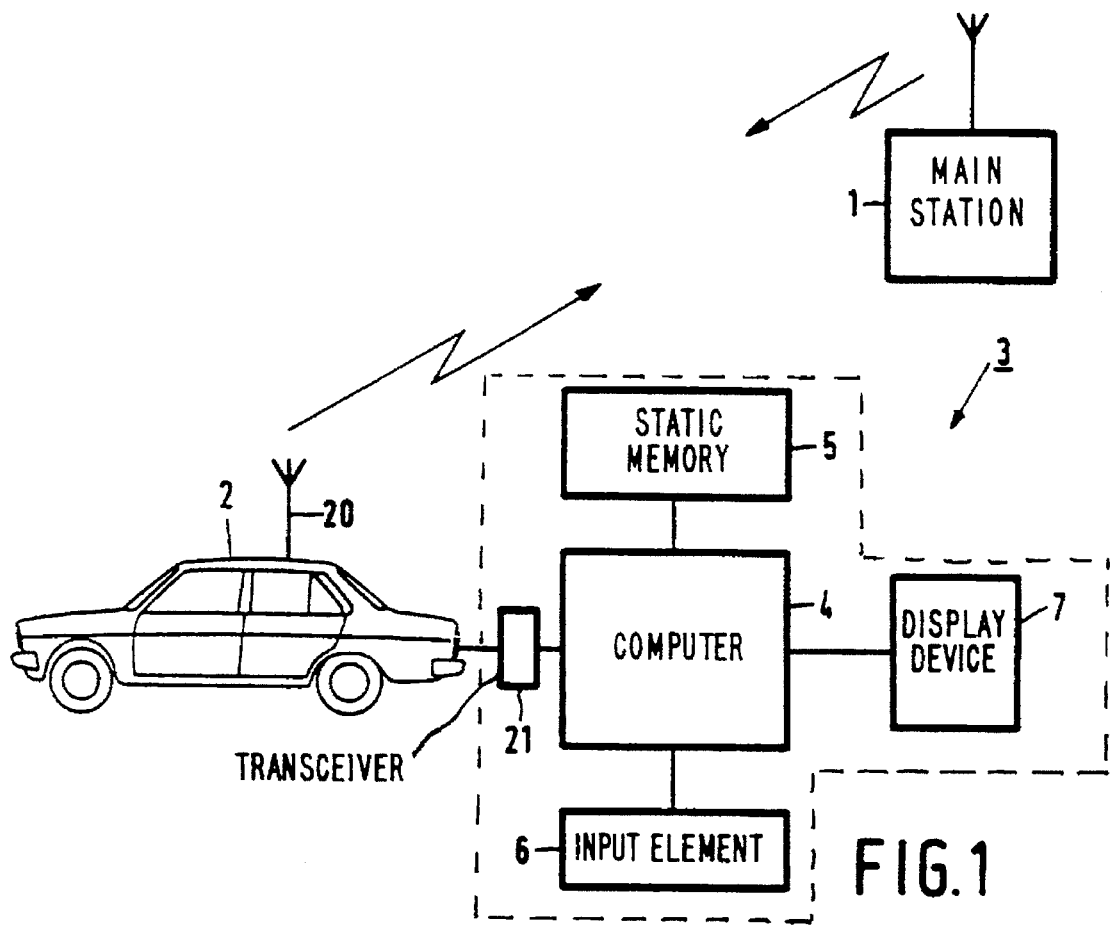
FIG. 1 shows a block diagram of a main station and a sub-station.

The invention is pre-eminently suitable for use in a traffic navigation system known per se and will therefore be discussed hereinafter by way of illustrative example in conjunction with a traffic navigation system in which a main station 1 continuously transmits navigation information for a plurality of vehicles 2 located in a coverage area of the main station 1, no more than a single vehicle being represented in FIG. 1, and the vehicles comprising each a sub-station 3 with a navigation computer 4. The navigation computer 4 which is represented outside the vehicle 2 for clarity in FIG. 1 but is generally naturally on board the vehicle 2, comprises a static memory 5, for example a CD ROM, in which basic data are stored relating to the road system in at least said coverage area. Furthermore, the navigation computer 4 comprises an input element 6, for example a keyboard, by which a user may input data relating to, for example, his point of departure and his destination. On the basis of, for example, the point of departure, the destination and the basic data of the road system stored in the memory 5, the navigation computer 4 computes the route to be followed and informs the user of this route via a display device 7. The display device 7 may comprise, for example, a picture screen and/or a loudspeaker through which instructions may be given to the user.

Auxiliary information is transmitted by the main station 1 by way of the downlink. The auxiliary information relates to situations differing from the situations stored in the memory 5. An example of such a different situation may be, for example, a road closed to traffic due to an accident or works, or a newly opened road. Another example is the situation in which there is a tailback on a specific road.

Although it is possible to arrange the traffic navigation system in such a way that a sub-station 3 announces its point of departure and its destination to the main station 1 and that the main station 1 on the basis of this information transmits to this sub-station 3 only the auxiliary information relevant to that sub-station 3, this is not desired in practice. The major reason for this is the protection of privacy of the users of the traffic navigation system, that is to say, the drivers of the vehicles 2. Therefore, said auxiliary information is transmitted as information available to any user. For receiving the auxiliary information, each sub-station 3 has an aerial 20 and a transmit/receive section 21 for transferring the received information to the navigation computer 4 and receiving from the computer information to be transmitted. In the navigation computer 4 of the vehicle 2 it is then determined which auxiliary information relates to the route to be followed by that vehicle 2 and, possibly, the route to be followed is adapted to the current situation.

A limiting factor of the reliability of such a traffic navigation system is the speed with which such auxiliary information is adapted to changing current situation. For example, when there is an accident it is important that the auxiliary information is adapted immediately, on the one hand, for the other road users to avoid delay and, on the other hand, generally for avoiding tailbacks being formed on the road, so that emergency services can reach the place of the accident very fast.

For improving the reliability of the described prior-art traffic navigation system, according to an important aspect of the present traffic navigation system, each sub-station 3 transmits to the main station 1 information relating to the accessibility of a section just covered by the vehicle 2 concerned. This information about the accessibility of the section generally relates to the average speed with which a specific section can be covered but may also relate, for example, to temperature in connection with the chance of black ice.

Figure 2:
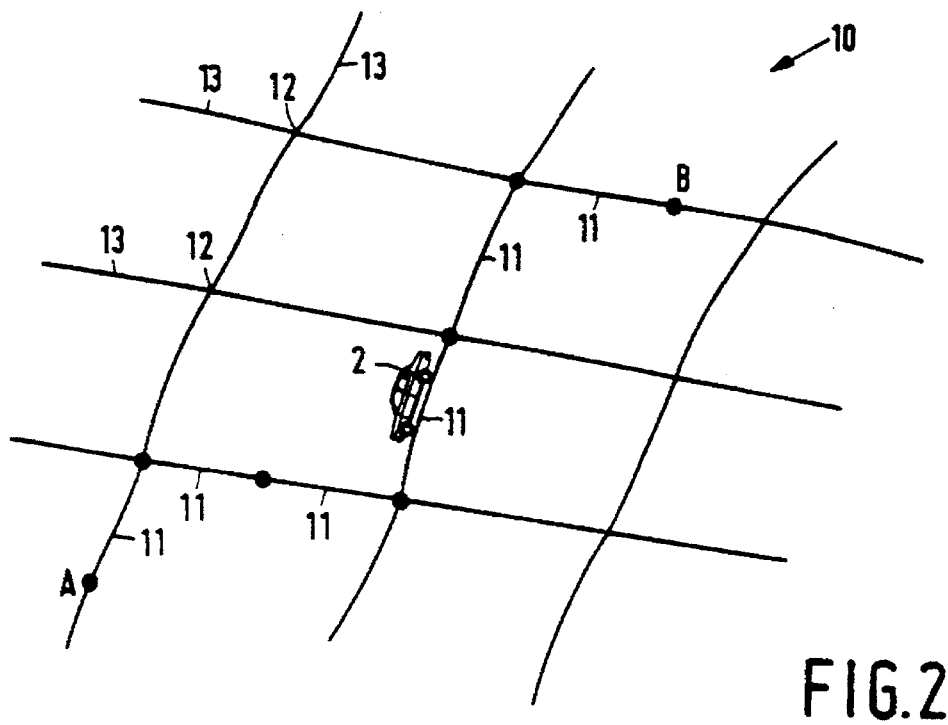
FIG. 2 schematically shows a road system.

FIG. 2 diagrammatically shows a part of a road system 10 on which a vehicle 2 moves from a point of departure A to a destination B. The road system 10 is subdivided into sections 11 in a predetermined manner. The manner in which this subdivision has taken place is not important for a proper understanding of this invention and will therefore not be further described. It should only be observed, however, that this subdivision need not be identical with the subdivision obtained from crossroads 12 of roads 13.

Always when the vehicle 2 leaves a section 11, the navigation computer 4 produces a message containing information relating to the identity of the section 11 concerned and, for example, the average speed and travelling time respectively, the vehicle 2 has reached in the section 11, and this message is sent to the main station 1. Such a message may comprise various data packets which are each to be transmitted in a respective time slot. Again for protection of the privacy of the users of the traffic navigation system the message generally has no information relating to the identity of the sender.

It should be observed that producing and transmitting such messages may also be effected when the driver of the vehicle 2 does not make use of the navigation system as such, that is to say, is not guided by the navigation computer 4 for the selection of his route.

It will be obvious that in practice the relevant section 11 will be driven by a plurality of vehicles 2, so that the main station 1 receives a plurality of independent "measurements" relating to the average speed or travelling time which is apparently feasible in the section 11.

It will also be obvious that a delay in the data packet production and data packet transmission of the order of several seconds or even minutes is acceptable. Although such a delay is to be considered considerable in communication technology, and unacceptable for example for relaying telephone conversations, a time scale of several seconds may be considered "direct" for passing on traffic information.

The nature of the contents of the message even permits the total loss of several messages: for this matter, the main station 1 receives a plurality of messages relating to the same section 11, whereas the contents of such a message, though extremely useful, are only to be considered auxiliary information.

For completeness' sake it should be observed that a data packet may also contain information of a different type. For example, a taxi or a goods transport vehicle may send information relating to its location to the main station 1, in which case the main station 1 acts as a relay station for sending this information to a central station of the relevant taxi or haulage business. A vehicle 2 may also transmit an emergency message, for example, if this vehicle 2 is involved in an accident.

Figure 3:
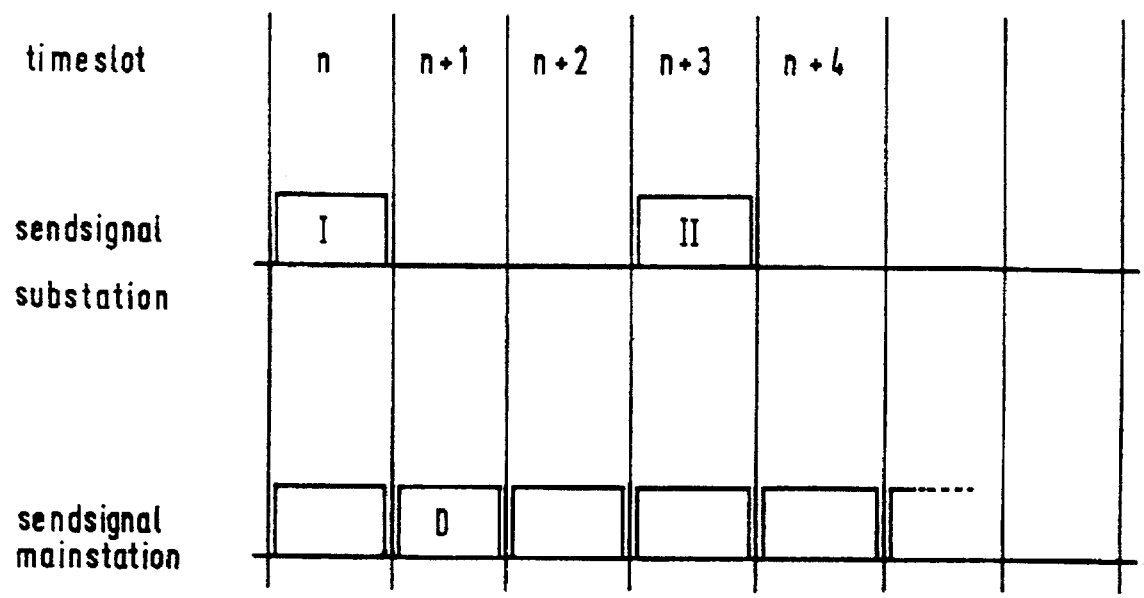
FIG. 3 shows a time diagram of an uplink signal and a downlink signal.

FIG. 3 shows a time diagram of the transmission of a message by a sub-station 3 while an embodiment of a data transmission protocol according to the invention is utilized.

At a certain moment the sub-station 3 has a message to be transmitted. Commencing with the next vacant time slot a sub-station 3 can transmit the first data packet I. In this time slot the transmission probability p has a predetermined value, whereas the probability of non-transmission is equal to 1−p. Therefore, the identity of the actual time slot in which the sub-station 3 transmits the first data packet I to the main station 1 (uplink), is not known in advance. In this connection it is merely observed that the probability that the first data packet still has not been transmitted after x vacant time slots have elapsed, is equal to $(1-p)x$, for $x \geq$.

In the following the time slot in which the sub-station 3 transmits the first data packet I of the message is referenced "n". Although the invention is also applicable to the case where the main station 1 acts as a relay station for the data packets, such as, for example in satellite communication, the data packet I received by the main station 1 in above example of a navigation system is not relayed, but processed by the main station 1 itself. In that case the main station 1 is arranged for detecting whether the received data packet I is received correctly or in a disturbed manner, an example of the disturbed reception being given in the case where two sub-stations transmit a data packet in the same time slot. For detecting whether the reception is correct or disturbed, each data packet may comprise check bits.

By way of illustration there will now be a brief description of such a detection. If the main station 1 does not detect any signal strength of the uplink carrier frequency in a specific time slot, the main station deduces that none of the sub-stations has transmitted a data packet in this time slot. If the main station 1 does detect signal strength of the uplink carrier frequency in a specific time slot, the main station 1 performs a check procedure with the aid of the check bits. Depending on the result of this check procedure the main station deduces whether the data packet has been received correctly or not.

Figure 6:
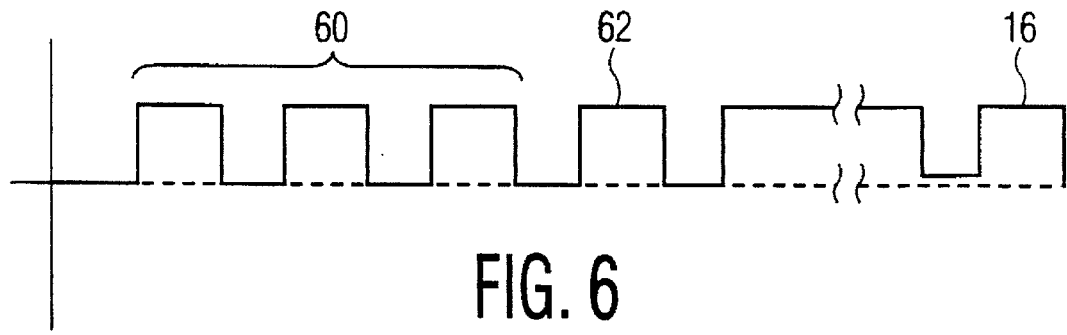
FIG. 6 is a time diagram of a message.

In the time slot n+1, subsequent to the time slot n, the main station 1 transmits a data packet D intended for all the active sub-stations 3 (downlink), in which, as shown in FIG. 6, data packet D at least a single data bit 62 is indicative of the receive condition of the data packet I received in the time slot n. In addition to this at least one data bit the information in time slot n+1 may further consist of information suitable for all the sub-stations, for example, traffic information. On the basis of the value of this receive condition bit said sub-station 3 decides whether a next data packet II to be transmitted is to be again the data packet I transmitted in the time slot n, when the receive condition bit received in the time slot n+1 is indicative of a disturbed reception, or whether the next data packet II to be transmitted may be a second data packet.

It should be observed that the manner in which the data bits of the data packets are coded is not relevant to a proper understanding of the present invention, so that a further description of this coding will be omitted here. Neither is it important for a proper implementation of the method according to the present invention how many data bits a data packet contains and what position the receive condition bit has in the data packets to be transmitted by the main station 1. By way of example, each data packet D to be transmitted by the main station 1 first comprises a predetermined number of alternating synchronizing (sync) bits 60 and the next bit 62 is the receive condition bit while, also by way of example, the value "0" for the receive condition bit may be indicative of a disturbed reception and the value "1" for the receive condition bit is indicative of a correct reception.

By transmitting a receive condition bit by the downlink, there is already the advantage that in the downlink no transmission time needs to be used for repeating the received data packets, whereas an "acknowledgement of receipt" can still be sent to each user. It should be observed in this context that such an "acknowledgement of receipt" will only have significance to a sub-station that transmitted a data packet in the previous time slot. This sub-station may then continue transmitting data packets according to the method of the present invention.

Concurrently with the above-mentioned "acknowledgement of receipt", a reservation is made of a next time slot. In an embodiment the receive condition bit, when indicative of a correct reception, is likewise used for reserving such a next time slot for the relevant sub-station. The reservation of the next time slot may take place in accordance with a fixed procedure for the communication system, in which there has been determined in advance which time slot is reserved when a time slot transmitted by the main station comprises a reservation bit 66, for example, the next time slot or the next-but-one time slot etc. As already observed hereinbefore, the "acknowledgement of receipt" is only important to the sub-station that transmitted a data packet in the previous time slot, and the reserved time slot will thus only be reserved for said sub-station. In an embodiment as illustrated in FIG. 3 the reserved time slot is the time slot n+2. Commencing with the time slot n+2 the sub-station may then always transmit in the time slots n+2, n+4, n+6, etc., a receive condition bit then being transmitted by the main station in the time slots n+3, n+5, n+7, etc. Since all the remaining stations receive the receive condition bit in the time slots n+1, n+3, n+5, n+7, etc. and, when this is indicative of a correct reception, deduce from this that the time slots n+2, n+4, n+6 etc. are reserved for another sub-station (without knowing which sub-station), they will not transmit in the time slots n+2, n+4, n+6 etc., so that the data packet of the transmitting sub-station does not run the risk of colliding with other data packets. This improves the throughput of the uplink because the probability of incorrect reception has decreased.

It should be observed that the data contents of the data packet transmitted by the downlink may further be identical with those of the data packet transmitted by the uplink, in the case where the main station operates as a relay station, but that in the traffic navigation system discussed by way of example the data contents of the data packet transmitted by the downlink will generally differ from those of the data packet transmitted by the uplink.

Figure 7:
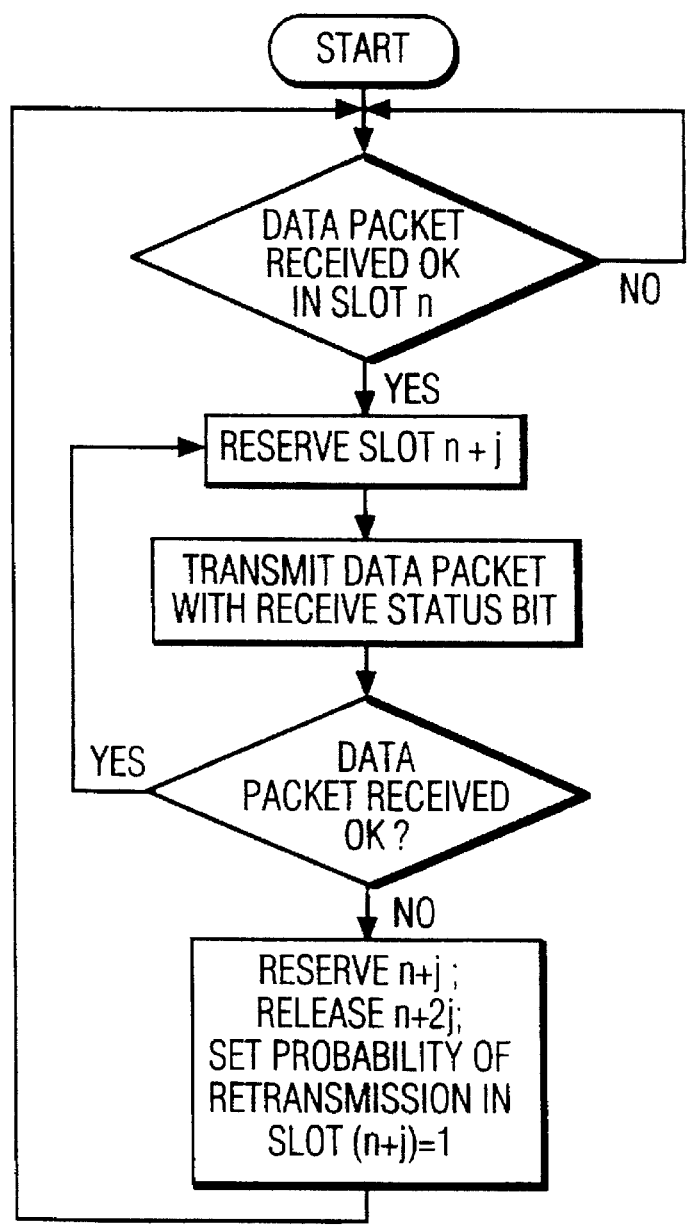
FIG. 7 is a flow chart diagram showing the method of this invention.

It should further be observed that in the above example two sub-stations may concurrently, but alternately, utilize the uplink: one sub-station may send in the time slots n+1, n+3, n+5, n+7 etc., whereas the other sub-station may send in the time slots n+2, n+4, n+6, etc., without disturbing one another. If it is desired that a plurality of sub-stations may concurrently, but alternately, utilize the uplink, a receive condition bit transmitted in time slot n +1 and indicative of a correct reception may generally imply a reservation of the time slot n+j for the relevant sub-station, where j may be an integer greater than or equal to 2. The number of sub-stations which may concurrently, but alternately, utilize the uplink is then generally equal to j. Alternatively, it is possible to have a dynamic time slot allocation by having the main station send out in addition to the receive condition bit one or more bits which indicate which time slot is exclusively reserved for the station to which the receive condition bit relates. A flow chart diagram of the method of this invention is shown in FIG. 7. In accordance with the invention, if a data packet is correctly received by the main station in a time slot n on the up link, the main station reserves a time slot n+j for that substation and transmits a data packet with a receive data bit on the down link. Thereafter, as long as data packets are received okay, the reservation of a next time slot continues. If a data packet is not received, either because there are no more data packets, slot n+j is reserves, but slot n+2j is released, and the probability of retransmission in slot n+j is set equal to 1.

Although it is no longer possible that a reception is disturbed as a result of collisions, it is still possible that the disturbance of some other cause occurs. The consequence of this is simply that a receive condition bit transmitted in time slot n+1 is indicative of a disturbed reception, so that the relevant sub-station has no longer a reservation for the time slot n+j, causing this time slot n+j to be released for use by any sub-station (thus also said relevant sub-station), while the sub-stations that wish to transmit determine on the basis of the probability p whether they will actually transmit, as has already been observed hereinbefore.

Figure 4:
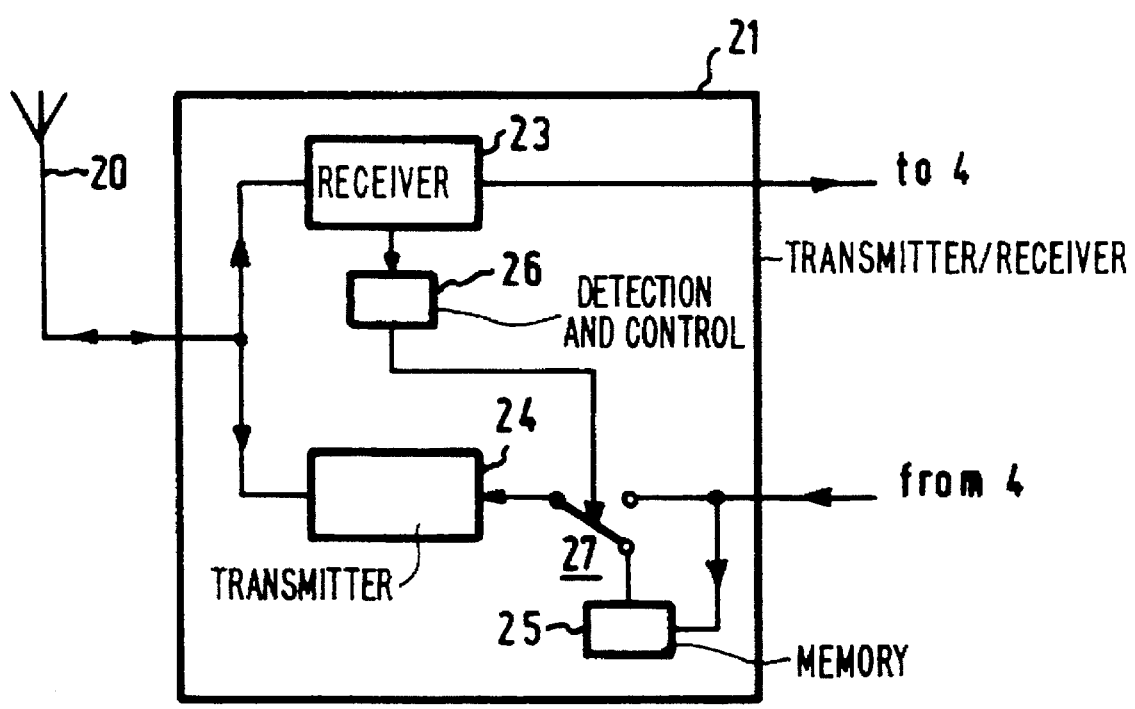
FIG. 4 shows in a diagram the structure of the transmit/receive section of a sub-station.

A possible embodiment of the transmit/receive section (21) of the sub-station 3 is shown in more detail in the block diagram of FIG. 4. The sub-station 3 comprises a receiver 23 for receiving the information received by the aerial 20 and transferring this information to the navigation computer 4. The sub-station further includes a transmitter 24 for transmitting the information received from the computer 4. Transmission and reception is effected in a manner known per se in time slots whose synchronization is controlled from the main station. The receiver 23 is coupled to a detection-cum-control circuit 26 which detects the received information for the presence of receive condition bits. The information packets to be transmitted, supplied by the computer 4 are constantly fed to a memory 25 which always saves at least the information packet transmitted most recently by the sub-station 3. The detection-cum-control circuit controls a switch 27, so that if a positive receive condition bit, i.e. the acknowledgement of correct reception, is detected, the switch 27 couples the transmitter 24 direct to the computer 4 for transmitting consecutive information packets in the predetermined time slots. However, if the detected receive condition bit is negative, the unit 26, via switch 27, couples the transmitter 24 to the memory 25 for retransmission of the stored information packet that has been transmitted most recently.

When said sub-station has finished transmitting data packets, it may simply stop transmitting. The main station then receives no signal in the relevant time slot n and reacts to the suspended reception by transmitting a receive condition bit indicative of a disturbed reception, so that the time slot n+2 becomes available for use to any sub-station.

At the end of a certain message one reserved time slot is thus not utilized, in other words, there is always one empty time slot per message. If one wishes to achieve a further efficiency improvement by utilizing this empty time slot, this may be done by having the sub-station co-transmit a code in its last data packet which code is indicative of the condition of "end of message". This may be realized in practice by using one bit as a time slot reservation bit in each data packet transmitted by the sub-station to the main station. By way of example, the value of 1 of this bit is indicative of the situation in which the sub-station is still to transmit at least one data packet and thus requests for the reservation of a next time slot, whereas the value of 0 of this bit is indicative of the situation in which the sub-station has finished transmitting and thus no longer needs a reservation of the next time slot. The next time slot (n+j) may then be immediately utilized by another sub-station that wishes to transmit.

Whether this option according to the invention is made use of depends, for example, on the average length of the data packet relative to the average number of data packets per message. For example, if the number of bits that can be transmitted in a data packet is equal to 60, the fact that a time slot is not utilized implies a "loss" of 60 bits per message. Alternatively, the use of a time slot reservation bit in each data packet implies a "loss" of 1 bit per data packet. The use of a time slot reservation bit is then only advantageous if the average number of data packets per message is less than 60.

If the protocol variant with a time slot reservation bit is actually used, and the time slot n+j is released to be used by other sub-stations if the transmitting sub-station denotes in the data packet transmitted in the time slot n that this data packet is the last one of the message, the transmitting sub-station receives no details relating to the reception quality of this last data packet from the main station. This situation may be acceptable if it appears that the chance of disturbance is acceptably small. It should once again be observed that no disturbance may occur as a result of colliding data packets, because none of the remaining sub-stations transmits while the last data packet is being transmitted. However, if one wishes to guarantee the reliability of the system in all cases and, consequently, provide also a receive condition bit relating to the last data packet of a message, the main station preferably transmits a separate receive condition bit and a separate time slot reservation bit. Similarly to the manner described above, the receive condition bit is only of importance to the transmitting sub-station and this sub-station determines in response to the receive condition bit whether the data packet transmitted last has been correctly received or is to be repeated. The time slot reservation bit denotes to the transmitting sub-station that it is permitted to transmit in the time slot n+j, whereas it denotes to the other sub-stations that they are not permitted to transmit in the time slot n+j, which is also comparable to the above. When the main station receives in the time slot n a data packet in which the time slot reservation bit is indicative of the situation in which the relevant sub-station requests no further reservation of a time slot (i.e. "end of message"), again the receive condition bit has only importance to the transmitting sub-station, whereas the time slot n+j is released to all the sub-stations by means of the time slot reservation bit.

Figure 5:
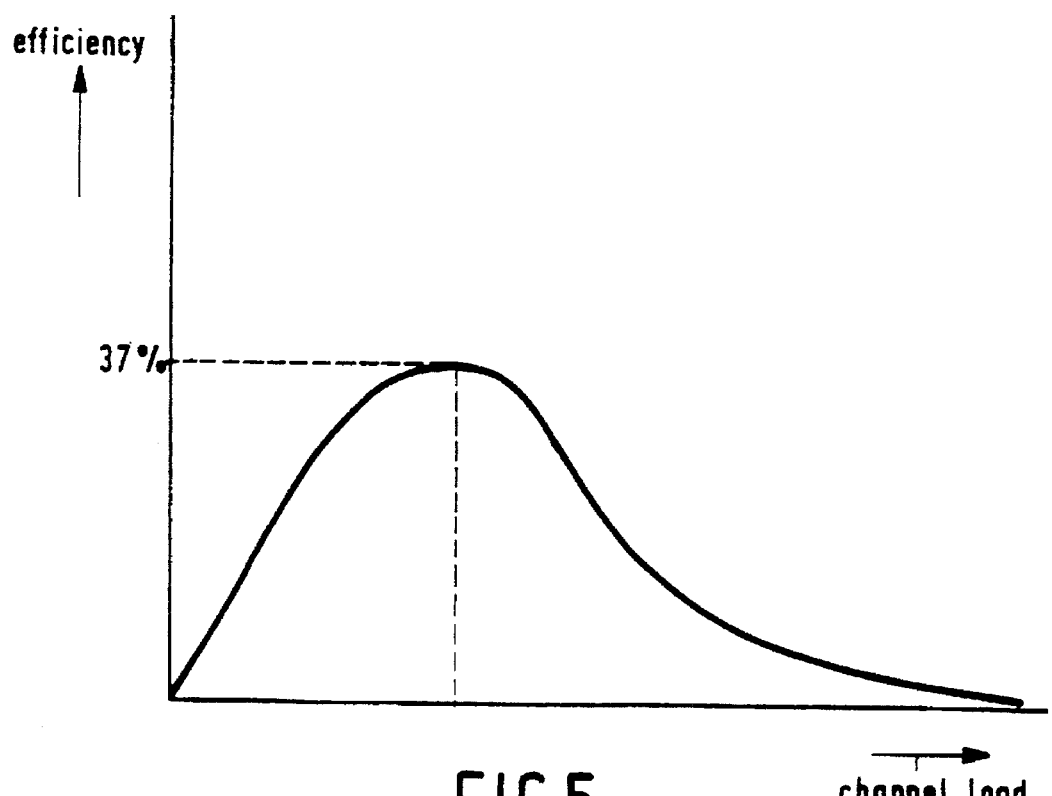
FIG. 5 shows a curve representing the relationship between the instantaneous throughput and the instantaneous transmission load of a communication signal when the prior-art method is used.

It will be evident that the instantaneous load of the uplink communication channel is proportional to p and to the number of sub-stations that attempt to transmit a message. As is known, the instantaneous throughput of the uplink communication channel depends on its instantaneous load as shown by the curve of FIG. 5 (cf. FIG. 6.3 of said publication), in which the average throughput with optimum load is equal to 37%. Implementation of the method according to the invention improves the throughput. This may be understood because in the prior-art method each data packet of a message is transmitted by the uplink in a statistically competitive manner, whereas in the method according to the invention only the first data packet of a message is transmitted in a statistically competitive manner and all the other data packets of the message are transmitted with certainty in predetermined reserved time slots.

It should be observed that the messages to be transmitted may be classified in various categories and that the probability p may be different for messages of different categories. For example, in addition to above messages relating to section information (to be termed category I hereinafter), also messages intended for a haulage business and relating to the localization of the vehicle (to be termed category II hereinafter), and emergency messages (to be termed category III hereinafter) may be transmitted. Category III messages have priority over category I and II messages and, for example, have a fixed large send probability p of 1/20.

Category II messages may have priority over category I messages and may also have a higher send probability. In a simple embodiment there is a fixed relationship between the probabilities p(I) and p(II), for example, p(II)=10xp(I). It should be observed that not every sub-station needs to be arranged for transmitting category II messages.

All this implies that first it is determined in the sub-station whether messages in the category III are to be transmitted. If so, these messages are transmitted with the associated channel access probability p(III). If not, there is determined in the sub-station whether messages in the category II are to be transmitted. If so, these messages are transmitted with the associated channel access probability p(II). If there are no messages to be transmitted in the II and III categories, any messages in the category I are transmitted with the associated channel access probability p(I). Therefore, in practice it may occur that a specific message in the category I experiences considerable delay before being transmitted. Although this is no objection as such, as has already been observed hereinbefore, it will be evident that there will no longer be a need for receiving the message concerned after some time.

The sub-station may therefore be arranged for deleting from its memory a specific message that has already been waiting for a specific amount of time, for example, five minutes, and not transmitting same. Such a line of thought also relates to the messages of the category II: a haulage business is generally interested in the current location of its vehicles, but not in information about their locations of, for example, an hour previously. "Rejecting" the belated messages thus reduces the load of the communication channel, which load reduction will specifically occur when there are large delays i.e. when there is a large channel load.

In a further embodiment of the method according to the invention the reservation of a next time slot is not valid with respect to category III messages. Such a message which may be used, for example, for asking for assistance if the vehicle concerned is involved in an accident, is to be transmitted as fast as possible and each delay is then undesired. Immediately after the need for transmitting a category III message in a specific sub-station, this sub-station transmits the first data packet of the emergency message arises in the next time slot, irrespective of the time slot being reserved or not for exclusive use by another sub-station. If this time slot was actually reserved for use by another sub-station, the first data packet of the emergency message will "collide" with the data packet transmitted by the other sub-station, to which event the main station will react by transmitting a receive condition bit indicative of poor reception and by transmitting a time slot reservation bit, if any, which is indicative of a non-reserved next time slot. In other words, the constantly repeated reservation of a next time slot by another sub-station is interrupted and the time slot sequence n, n+j, n+2j, ... is released for access by all the sub-stations. For actually gaining access to the time slot, the emergency message is still to compete with any other sub-stations that wish to gain access to this time slot sequence, for example, the sub-station whose reservation sequence has just been interrupted. Since the access probability is determined statistically, and because this probability is much greater for an emergency message than for a message from the categories I and II, there is an extremely large probability that an emergency message gains access to the uplink in a relatively brief period of time.

If so desired, .the probability of gaining access to the uplink for the transmission of an emergency message may further be enhanced by implementing one or a plurality of the following measures.

As a first measure may be stated the arrangement of the communication system, so that when a reservation sequence is interrupted as described hereinbefore, all the further sub-stations leave the time slot n+j vacant, whereas the sub-station that wishes to send out an emergency message sends out with full certainty (probability=1) in the time slot n+j. If also this attempt to gain access fails, the competitive access attempt may be started from time slot n+2j, so that even in the exceptional case where various sub-stations wish to send out an emergency message concurrently, their emergency messages will certainly collide, so that no access at all will be gained and the communication channel will be blocked.

In an embodiment in which in the downlink only a receive condition bit is transmitted which is then likewise used for reserving the time slot n+j, this option deliberately "sacrifices" one time slot each time a reservation sequence is terminated. In an embodiment in which always a separate receive condition bit (C) as well as a separate time slot reservation bit (R) is transmitted in the downlink, the unnecessary sacrificing of one time slot after each reservation sequence may be avoided. For that matter, with these two bits C and R, it is possible to distinguish four situations with respect to a data packet transmitted in the time slot n through the uplink. These situations will hereinafter be further clarified by way of example in which for simplicity the value C=1 denotes a correctly received data packet and the value R=1 a reservation of a time slot n+j 1) C=1, R=1: the data packet in the time slot n has been received correctly and the time slot n+j has been reserved.
2) C=1, R=0: the data packet in the time slot n has been received correctly, but the time slot n+j is vacant (provided that the sub-station transmitting in the time slot n−j had announced through the uplink that the data packet concerned was the last one of the message, as described hereinbefore).
3) C=0, R=0: in the time slot n no data packet has been received; it was either a matter of disturbed reception, while there was also disturbed reception in the time slot n−j or even "no data packet" reception. The time slot n+j is vacant.
4) C=0, R=1: there was disturbed reception, whereas in time slot n−j there was undisturbed reception (and, if applicable, the sub-station transmitting in the time slot n−j had announced through the uplink that the relevant data packet was not the last one of the message, as described hereinbefore). The time slot n+j continues to be reserved. This situation will occur if by any reason there is a disturbance in the reception of a data packet during a reservation sequence, which will generally rarely if ever occur through any cause different from a sub-station "breaking into" the reservation sequence, so as to gain access for transmitting an emergency message.

As a second option for enhancing the probability of gaining access to the uplink for transmitting an emergency message there is not only "breaking into" one of the reservation sequences, but into a plurality, for example all of the reservation sequences. This may for example be realized by simply sending a data packet (e.g. dummy data packets) in the time slots n, n+1, n+2, etc. until a message of proper reception and reservation is received in the time slot n+1, n+2, n+3, etc. by way of the downlink. However, there may be a risk that the communication channel is completely clogged when a plurality of sub-stations wish to send out an emergency message. In order to avoid this, j may be selected relatively large.

It will be evident to the expert that it is possible to change or modify the represented embodiment of the method according to the invention without distracting from the inventive idea or scope of protection of the invention. For example, it is possible for the receive condition bit and/or the time slot reservation bit is transmitted in the time slot n+j−1 instead of the time slot n+1.

I claim:

1. Method of transmitting data from a plurality of substations to a main station by way of a common channel including an up link and a down link, which channel is subdivided into time slots, the length and synchronization of which are determined by a corresponding time slot distribution of a data transmission signal transmitted on the downlink by the main station, each substation having a probability p, $0 \leq p \leq 1$, of transmitting a data packet on the up link in each time slot; the method comprising:

determining in the main station if the main station has correctly received, in the up link in a specific time slot n, a data packet coming from a specific substation, and if the data packet has been correctly received, reserving a next time slot n+j of the up link to be exclusively used by that specific substation, with j being a predetermined integer assigned to the substation such that $j \geq 2$, wherein each substation, in transmitting each data packet, transmits at least one bit indicative of a time slot reservation relating to said next time slot, and wherein the messages to be sent by the substation are classified in various categories and said reservation applies only to messages in predetermined ones of these categories, the method further comprising the steps of:
after a reservation sequence has been terminated by an incorrect reception of a data packet in the time slot n, continuing to reserve the time slot n+j and releasing the time slot n+2j, and for messages in a predetermined category, if the first data packet has not been received correctly, setting the probability of retransmission of that first data packet in the time slot n+j equal to 1.

2. The method of claim 1, wherein the time slots are random rather than in fixed frames.

3. A method of transmitting data from a plurality of substations to a main station by way of a common channel, including an up link and a down link, which channel is divided into time slots, the length and synchronization of which are determined by a corresponding time slot distribution of a data transmission signal transmitted on the down link by said main station, each substation having a probability p, with $0 \leq p \leq 1$ of transmitting a data packet on the up link in each time slot, the method comprising:

determining if the main station has correctly received, on the up link, in a specific time slot, a data packet coming from the specific substation, and if it has, reserving a next time slot to be exclusively used by that specific substation with j being an integer such that j is $\geq 2$;

transmitting a data packet on the down link from the main station in each time slot, the data packet comprising at least one bit which is indicative of the received condition of the data packet received in the previous time slot and at least one separate bit indicative of the reservation of the next time slot; and after a reservation sequence has been terminated by an incorrect reception of a data packet in a time slot n, continuing to reserve the time slot n+j and releasing the time slot n+2j.

4. Method for reducing data collisions in a data transmission system, which system includes a main station and a plurality of substations that communicate with the main station via a common channel, the channel being subdivided into time slots, which time slots have a length and synchronization determined by a corresponding time slot distribution of a data transmission signal transmitted by the main station, the method comprising the steps of:

in the substations, transmitting information to the main station, each substation having a respective probability p of transmitting a data packet in any given time slot;

in the main station, if there is successful reception of a particular data packet, in a first time slot n, transmitting a signal indicating successful reception in a time slot having a fixed relationship with the time slot n and in one of the substations, which one transmitted the particular data packet, reserving time slot n+j in response to the signal indicating successful reception, and where j is a predetermined value;

so that the substations deduce which time slot has been reserved in the data transmission system without the main station transmitting an explicit indication of which time slot has been reserved or which substation the time slot has been reserved for, and where n and j are integers with $j \geq 2$ and each respective probability p is a respective real number between 0 and 1.

5. Method of claim 4 further comprising, in the main station, if there is unsuccessful reception of the particular packet, transmitting a signal indicating unsuccessful reception in the time slot having the fixed relationship with the time slot n.

6. The method of claim 5, wherein the signal indicating successful transmission and the signal indicating unsuccessful transmission are opposite values of a single bit having a predetermined position within a respective data packet.

7. The method of claim 4, wherein each data packet transmitted by each of the substations contains an indication of the time slot n+j to be reserved by that substation.

8. The method of claim 4, wherein at least one of the substations has various categories of messages to be sent and the reserving step applies only to messages falling within applicable ones of the categories.

9. The method of claim 8, further comprising in response to a signal indicating unsuccessful reception which is received in said time slot having a fixed relationship with the time slot n, in the one substation, nevertheless reserving the time slot n+j;

releasing time slot n+2j;

if the data packet contains a message of a predetermined category, retransmitting the particular packet in time slot n+j with probability p=1.

10. The method of claim 9, wherein the signal indicating successful reception and the signal indicating unsuccessful reception are opposite values of a single bit having a predetermined position within a respective data packet.

11. The method of claim 4 comprising repeating the transmitting and reserving steps so that the one substation transmits a sequence of data packets in time slots n+j, n+2j, . . . ; and the main station transmits a sequence of signals indicating successful reception in time slots n+j+1, n+2j+1, . . . .

12. The method of claim 4, wherein the time slot having the fixed relationship with the time slot n is the time slot n+1.

13. The method of claim 4, wherein the time slots are random rather than in fixed frames.

14. A substation for use in a transmission system which comprises a main station and a plurality of substations similar to the substation, the substation comprising means for communicating with the main station via a common channel, the channel being subdivided into time slots, which time slots have a length and synchronization determined by a corresponding time slot distribution of a data transmission signal transmitted by the main station; and processing means for carrying out the following process:

transmitting information to the main station, the substation having a respective probability p of transmitting a data packet in any given time slot;

receiving from the main station, a signal indicating successful reception, in a time slot having a fixed relationship with the time slot n, if the main station successfully receives the data packet in a first time slot n; and reserving time slot n+j in response to the signal indicating successful reception, where j is a predetermined value;

so that the substation deduces which time slot has been reserved in the data transmission system without the main station transmitting an explicit indication of which time slot has been reserved or which substation the time slot has been reserved for, and where n and j are integers with $j \geq 2$ and each respective probability p is a respective real number between 0 and 1.

15. The substation of claim 14, wherein each packet transmitted by the substation contains an indication of the time slot n+j to be reserved by the substation.

16. The substation of claim 14, wherein the substation has various categories of messages to be sent and the time slot n+j reserved by the processing means applies only to messages falling within applicable ones of the categories.

17. The substation of claim 16, wherein the process carried out by the processing means further comprises, in response to a signal indicating unsuccessful reception, nevertheless reserving the time slot n+j;

releasing time slot n+2j; and if the data packet contains a message of a predetermined category, retransmitting the packet in time slot n+j with probability p=1.

18. The substation of claim 14 wherein the process carried out by the processing means comprises repeating the transmitting and reserving steps so that the substation transmits a sequence of data packets in time slots n+j, n+2j, . . . ; and the main station transmits a sequence of signals indicating successful reception in time slots n+j+1, n+2j+1, . . . .

19. A transmission system comprising a plurality of substations as claimed in claim 14; and the main station.

20. The system of claim 19, wherein the substation is a navigation computer on board a vehicle, the navigation computer comprising a static memory for storing road information; and the main station is for transmitting auxiliary information to be used by the substations for supplementing contents of the static memories.

21. The substation of claim 14, wherein the processing means receives a signal indicating unsuccessful reception from the main station, in the time slot having the fixed relationship with the time slot n, if the main station does not successfully receive the data packet.

22. The substation of claim 14, wherein the time slot having the fixed relationship with the time slot n is the time slot n+1.

23. The substation of claim 14, wherein the time slots are random rather than in fixed frames.

24. A method for transmitting data from a plurality of substations to a main station by way of a common channel, which channels includes an up link and a down link and is divided into time slots, the time slots having a length and a distribution determined by a corresponding time slot distribution of a data transmission signal transmitted on the down link by the main station, each subdivision having a probability p, $0 \leq p \leq 1$, of transmitting a data packet on the up link in any given time slot; the method comprising:

assigning to each substation a respective value of a numerical identifier j having integral values ranging from at least 2 onward;

determining, in the main station, if the main station has correctly received in the up link in a specific time slot n a data packet coming from a specific substation, and in case of a positive result of the determining step, reserving a next time slot n+j of the up link to be exclusively used by the specific substation, with j having the numerical value assigned to said substation, so that said substation may uninterruptedly continue to transmit data packets in time slots which follow the time slot n at time invariant integral multiples of the value of j assigned to said substation.

* * * * *